Oct. 21, 1952  H. L. MOWBRAY  2,614,475
ROD WEEDER FOR CHISEL PLOWS
Filed Oct. 27, 1949
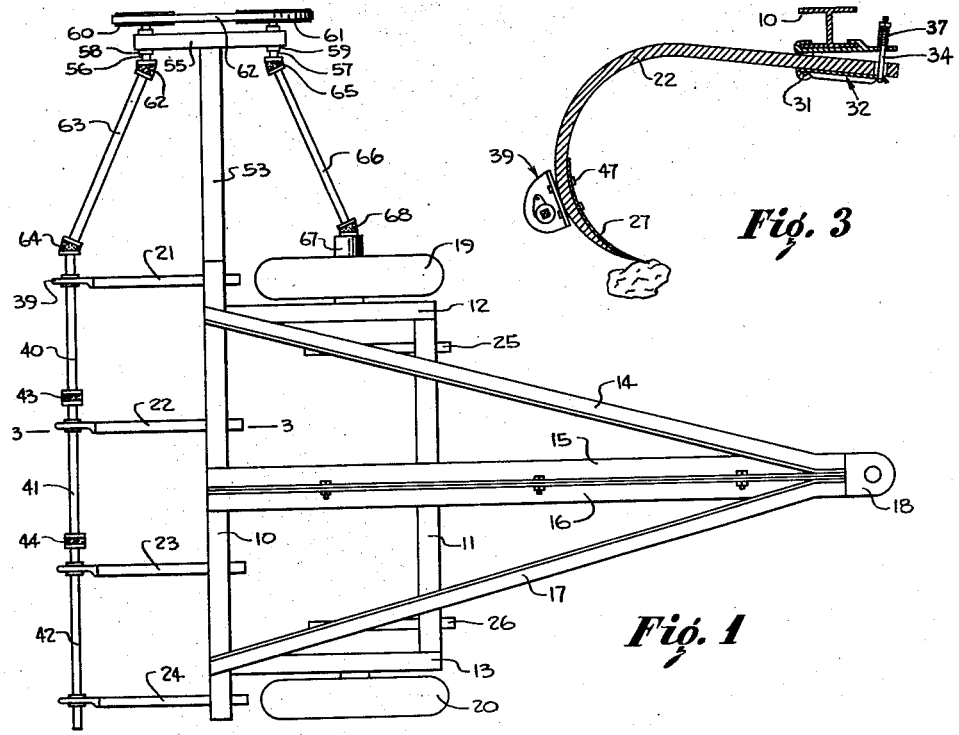
HARRY L. MOWBRAY
INVENTOR
Hubert Miller
Attorney Patented Oct. 21, 1952

2,614,475

UNITED STATES PATENT OFFICE 2,614,475

ROD WEEDER FOR CHISEL PLOWS

Harry L. Mowbray, Medford, Okla.

Application October 27, 1949, Serial No. 123,903

5 Claims. (Cl. 97—42)

This invention relates to what is generally known in the agricultural implement field as a rod type weeder. Such weeders consist of a long rod of irregular cross section mounted transversely at the rear of a chisel type plow. Bearings are provided in which the rod rotates, and a suitable power take-off rotates the rod during the plowing operation. The rotating rod travels at below ground level, and due to its rotation and shape, picks up weeds that are loosened by the plow, pulls their roots from the ground, and releases them to wither on top of the ground.

It has not previously been practical, however, to use such weeders when plowing rocky soil, because the contact of any single plow chisel with an underground rock resulted in throwing that chisel out of lateral alinement with all the other plow chisels, which in turn resulted in bending the rod and rendering it incapable of further operation until it was removed and straightened. The farmer-operator simply could not afford to take the time to remove and straighten the rod every few minutes.

It is the chief object of my invention to provide a sectional rod weeder each section of which is capable of assuming a position of misalinement with respect to the other sections without affecting the continued efficient operation of the weeder.

It is another object of the invention to provide a sectional rod weeder which is capable of being mounted on a chisel plow which is so designed that each chisel is capable of freely moving out of lateral alinement with the other chisels when a rock, root, or other underground obstruction is encountered.

It is another object to provide bearings for the various sections of the rod which will permit them individually to move to positions of longitudinal misalinement with relation to the other sections without affecting their ability to continue rotating freely.

The invention, together with other objects attending its production, will be more clearly understood when the following description is read with reference to the accompanying drawings, in which:

Fig. 1 is a plan view of a chisel plow with the rod weeder of this invention attached thereto;

Fig. 2 is a rear view of the same, illustrating the operating misalinement of two rod sections when a chisel encounters an obstruction;

Fig. 3 is a section taken along the line 3—3 of Fig. 1 and shows one form of pivot mounting for the chisels of chisel plows;

Fig. 4 is an exploded perspective view showing the details of construction of the pivot mounting illustrated in Fig. 3;

Fig. 5 is a side view, partially in section, of a suitable bearing for journalling the various rod sections; and Fig. 6 is a section taken along the line 6—6 of Fig. 5, and shows further details in the bearing construction.

Since the invention is adapted for attachment to a chisel plow, the plow will first be described.

The plow frame includes I-beam transverse members 10 and 11, and angle iron longitudinal members 12, 13, 14, 15, 16, and 17, the latter four of which terminate forwardly in a tractor hitch which includes a perforated hitch plate 18. Wheels 19 and 20 are journaled on axles which are rigidly supported by the frame. Chisels 21, 22, 23 and 24 are carried by the rear transverse frame member 10, and a suitable plurality of similar chisels 25 and 26 are usually carried by the frame member 11. Each chisel carries an arcuate plowing blade 27. The plow, as described above, forms no part of my invention.

As a means of pivotally mounting the chisels on the frame member 10 a bracket 28 is provided. This bracket is formed to slip tightly onto the lower flange of the I-beam 10, and may be held firmly thereon by any suitable means such as a conventional set screw, not shown. At one end the bracket 28 carries integral depending perforated ears 29 and 30 which are spaced laterally to receive the straight shank of the chisel. The chisel is held between these ears by means of a suitable bolt or pin 31, which passes beneath and also holds in position one arcuate end of a strap 32.

The opposite end of this strap is also arcuate, as shown, and is provided with a longitudinally disposed elongated slot 33. The shank of a T-bolt 34 is passed upward through the slot 33, through an alined similar slot 35 in the shank of the chisel, and through an alined similar slot 36 in the forward end of the bracket 28. A spring 37 is fitted loosely on the upper end of the T-bolt and a nut 38 is applied to hold the T-bolt in position. The assembly of these various parts is clearly shown in Fig. 3. This drawing figure also clearly illustrates how the spring 37 and the various slots through which the bolt 34 passes permit the forward end of the chisel shank to tilt downward when the rear end of the chisel encounters an obstruction. The rear edge of the bracket 28 simply serves as a fulcrum about which the chisel shank pivots.

As previously stated, my invention generally includes bearings, designated as a whole by the numeral 39, rod sections 40, 41, and 42, flexible couplings 43 and 44 which connect the ends of adjacent rod sections together, and a means of transmitting rotation from a ground wheel of the plow to the rod sections.

Referring particularly to Figs. 3, 5, and 6, the bearing includes a flat plate 45 and an integral flange 46 which is drilled to receive bolts 47 which pass through the arcuate portion of the chisel, and serve to anchor both the bearing plate and the plow blade 27 thereto. Near its lower end the plate 45 is provided with an elongated perforation the upper end of which is substantially semi-circular, as shown in Fig. 5. The semi-circular upper end of this perforation snugly receives a complementally shaped bearing half 48. One end of this bearing half 48 is made integral with a flange 49, which extends at right angles thereto and lies flat along the surface of plate 45 (see Fig. 6). The flange 49 is perforated and a bolt 50 passes through a suitably located perforation in the plate 45 and firmly holds the bearing half in position. A spool 51 has a central bore 52 of irregular cross section to complementally receive one of the rod sections 40—42. The central portion of the spool is of a diameter to be properly journaled in the bearing half 48, and the flanges at the end of the spool are of larger diameter to prevent it from accidentally slipping out of the bearing receiving hole in the plate 45.

As will be understood by those familiar with this art, ground pressure against the rod sections will normally keep the spools in a position to rotate within the bearing halves 48. Whenever one of the chisels is lifted by an obtruction, and the adjacent rod sections are moved out of transverse alinement, as shown in Fig. 2, the elongated bearing receiving hole in the plate 45 permits the spool 51 to tilt and to continue rotating with the rod, as shown in Figs. 2 and 6. It will be understood that the spool and the bearing half should be made of dissimilar metals for better wearing characteristics. It will also be seen that if at any time either the bearing halves or the spools become badly worn they can be easily and quickly replaced.

The flexible couplings 43 and 44 are illustrated only by the standard Patent Office mechanical symbols because the details in the construction of whatever type of coupling is used is not material. Any one of many types of universal joints could be used, or flexible plate couplings could be used.

As to the means of rotating the rod sections, I provide an I-beam extension 53 on the frame member 10, attached thereto by overlapped plates 54, one welded to each side of the I-beam web. On its outer end the extension 53 rigidly carries a cross member 55 which journals two stub shafts 56 and 57 in bearings 58 and 59. The outer ends of these shafts carry sheaves 60 and 61, which are connected together by a driving belt 62.

The other end of shaft 56 is connected by flexible coupling 62 to rod 63, the other end of which is in turn connected to one end of rod section 40 by means of a flexible coupling 64.

The inner end of shaft 57 is connected by flexible coupling 65 to rod 66, the other end of which is connected to a hub fitting 67 by means of another flexible coupling 68. Hub fitting 67 simply slips over the outer end of the hub of wheel 19 and is non-rotatably connected thereto by any suitable means, as by welding, or by bolting to the hub flange.

It will thus be seen that when the plow is drawn over the ground, the rotation of wheel 19 will be transmitted through the rod 66, pulleys 60—61, and rod 63 to the various rod sections 40—42. At any time one of the blades 27 encounters an obstruction it is free to move upward by pivoting its chisel. The adjacent rod sections simply move to positions of misalinement, as shown in Fig. 2, and the plowing operation continues without interruption, and without damage to the rod weeder.

Having described the invention with sufficient clarity to enable those familiar with the art to construct and use it, I claim:

1. The combination with a chisel plow which includes a wheel supported frame and laterally spaced ground engaging chisels mounted thereon for pivotal movement about transverse axes, of: normally transversely aligned bearings carried by the chisels; a spool carried by each bearing for rotational and transverse tilting movement therein; short rod sections supported in the bores of said spools; and flexible couplings connecting the adjacent ends of adjacent rod sections, and permitting rotation of the sections while slightly out of alignment.

2. The invention described in claim 1 in which the cross sectional shape and size of the rod sections and the bores in said spools are complemental and non-circular.

3. The invention described in claim 1, and means operably connected to at least one ground wheel and to at least one of said rod sections for transmitting rotary motion from the wheel to said rod sections as the plow travels along the ground.

4. In a plow of the class having a wheel supported frame and laterally spaced ground engaging chisels mounted thereon for independent pivotal movement on transverse axes, a weeding attachment therefor comprising: normally transversely aligned bearings carried by the chisels near their ground working ends; short rod sections journaled in said bearings; flexible couplings connecting the adjacent ends of adjacent rod sections permitting rotation of the sections while slightly out of alignment; a frame extension rigidly supported from the plow frame; a pair of jack shafts journaled in said frame extension; aligned sheaves or pulleys fixed to rotate with the respective shafts; endless drive means connecting said sheaves; flexible drive means rotatably connecting one of said shafts to a wheel of the plow; and flexible drive means rotatably connecting the other shaft to one of said rod sections.

5. In a combination chisel plow and rod weeder of the class which includes a wheel supported frame carrying a plurality of spaced chisel plow members which are independently movable in a vertical plane about individual transverse axes, and which carry bearings which collectively journal and support a transversely disposed weeding member rotated by mechanical connection with one of the ground wheels, the improvement which comprises: a transversely tiltable spool rotatably and loosely journaled in the bearing of each chisel plow member; a short weeding rod section supported in the bore of each spool and disposed in end to end relation, one end of each section terminating adjacent its spool; and a flexible coupling connecting the adjacent ends of each pair of said rod sections and permitting rotation of the sections while slightly out of alignment.

HARRY L. MOWBRAY.

REFERENCES CITED

The following references are of record in the file of this patent:

UNITED STATES PATENTS

| Number | Name | Date |
|---|---|---|
| 1,224,874 | Wolfe | May 1, 1917 |
| 1,781,409 | Rayfield | Nov. 11, 1930 |
| 2,176,541 | Morris | Oct. 17, 1939 |
| 2,325,882 | Scarlett | Aug. 3, 1943 |
| 2,353,485 | Miller | July 11, 1944 |
| 2,355,950 | Calkins | Aug. 15, 1944 |
| 2,385,404 | Crosby | Sept. 25, 1945 |
| 2,514,442 | Calkins | July 11, 1950 |